United States Patent Office 3,812,159
Patented May 21, 1974

3,812,159
POLYBASIC AROMATIC CARBOXYLIC ACIDS,
ESTERS AND ANHYDRIDES
Hyman R. Lubowitz, Hawthorne, Calif., assignor to
TRW Inc., Redondo Beach, Calif.
No Drawing. Continuation-in-part of abandoned application Ser. No. 799,106, Feb. 13, 1969. This application June 11, 1971, Ser. No. 152,439
Int. Cl. C07c 63/02, 63/48
U.S. Cl. 260—346.3      9 Claims

ABSTRACT OF THE DISCLOSURE

This invention relates to novel aromatic polycarboxylic acids, the anhydrides and isomers thereof and more particularly to the use of said acids and anhydrides for the preparation of thermally stable high-molecular weight polymers including, for example, the polyamides, polybenzimidazoles, polyimidazopyrrolones, polyimides, polyesters and the like. These acids and/or anhydrides are obtained by reacting stoichiometric amounts of an alkali metal $C_1$-$C_8$ mono- or poly-alkyl substituted phenoxide with bis(chlorophenyl) sulfone to obtain bis(alkyl-substituted phenoxyphenyl) sulfone intermediates which are oxidized to the corresponding bis(carboxyphenoxyphenyl) sulfones.

---

The invention described herein was made in the performance of work under a NASA contract and is subject to the provisions of Section 305 of the National Aeronautics and Space Act of 1958, Public Law 85–568 (72 Statute 435; 42 U.S.C. 2457).

This is a continuation-in-part of U.S. patent application, Ser. No. 799,106, filed Feb. 13, 1969, now abandoned.

This invention is directed to aromatic polycarboxylic acids, the anhydrides and isomers thereof, and more particularly to the use of said acids and anhydrides for the preparation of thermally stable high-molecular weight polymers including, for example, polyimides, polybenzimadazoles, polyimidazopyrrolones (polypyrrones), polyamides, polyesters and the like.

The novel acids and anhydrides of this invention which are particularly useful for preparing high-molecular weight polymers may be characterized by the following formula:

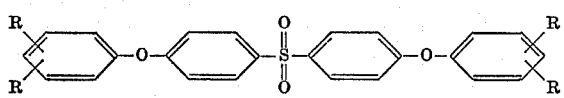

wherein R is selected from the group consisting of hydrogen, carboxylic acid, and anhydrides. It is important, however, for purposes of this invention that at least one of the R groups is a carboxylic acid group or the anhydride thereof, e.g., the dianhydride.

Generally, thermally stable resins that are capable of being fabricated into various products, e.g., laminates, adhesives, coatings, and molded objects are useful also in the advanced space vehicles and high-performance aircraft. Thus, thermally stable aromatic and heterocyclic materials have been investigated during the past years with considerable progress, in an attempt to obtain thermally stable high-molecular weight polymers. However, most of the present available synthetic materials have at least one or more deficiency which limits their use particularly in the fabrication of reinforced resin structures, e.g., glass laminates.

Heretofore, for example, during the preparation of polymeric materials, i.e., polyimides, appreciable quantities of volatile matter were evolved due to the vaporization of the solvent and the cyclization reaction, which caused a high void content in the final product. Furthermore, varnishes for laminating having high solids content are difficult to obtain due to the limited solubility of current polymers in suitable organic solvents. Moreover, most of the presently available polymers are obtained from precursors which are highly susceptible to degradation due to oxidation, thermal and hydrolytic conditions. Thus, it was found that these problems could be avoided, and compact void-free structures could be obtained by using the acids of this invention to synthesize relatively high-molecular weight polymers which contain thermally-stable phenoxyphenyl sulfone segments in the backbone of the polymer chain. The anhydrides or debasic acids of this invention, e.g., bis(3,4-dicarboxyphenoxyphenyl) sulfone dianhydride and bis(4-carboxyphenoxyphenyl) sulfone, are particularly useful in preparing high-molecular weight polymers, e.g., polyimides, polypyrrones, polyamides and polybenzimadazoles which may be reinforced with glass or graphite, etc., to obtain substantially void-free reinforced laminates.

In addition, the acids and anhydrides of this invention may be used to prepare polymers, useful as sealants, adhesives, fibers, films, and/or coatings in advanced aerospace structures. Recently, for example, various polymers have been developed which were found to satisfy the thermal requirements of a fuel tank sealant, but were inadequate in meeting many of the other requirements including, for example, chemical compatibility, mechanical properties, corrosion resistance, etc. One of the necessary criteria of a fuel tank sealant, for example, is the ability of the sealant to adhere to the walls of the tank, particularly when exposed to stress associated with the structural portions of a high-performance aircraft. Thus, it is obvious that high-modulus and brittle materials are not satisfactory for this purpose due to the high-stress imparted to the interface of the sealant and the tank substrate. Moreover, in addition to induced stresses, the sealant should be resistant to permanent distortion upon release of any applied force and should be particularly resistant to creep under the forces of compression and tension. Further, a fuel tank sealant is required to have suitable chemical characteristics including, for example, compatibility with the fuel at elevated temperatures, and should be particularly resistant to or not take part in the corrosion of the metal substrate. Thus, when the chemical and mechanical requirements are considered together with the thermal requirements, the number of polymeric materials presently available for this particular use are quite limited. Again, it has been found, however, that by utilizing the acids of this invention suitable polymers may be obtained which may be characterized as having aromatic and heterocyclic rings in the backbone and regarded to as being "stiff" polymers. These polymeric materials were found to be stable under oxidative conditions and to exhibit excellent dimensional stability at elevated temperatures and therefore displayed unusual resistance to creep under conditions encountered by most fuel tank sealants.

Further, while the polymeric materials of this invention may be cured by conventional means, the amount of volatile material released during the curing process is substantially reduced due primarily to the comparatively high-molecular weight of the acid monomers. Moreover, because the phenyl groups of the acids are separated by thermally stable linkages which also promotes solubility, the fully cured resins may be readily coated on various substrates, e.g., metal surfaces, with very little difficulty. The preparation and analysis of a glass-reinforced polybenzimidazole, for example, obtained from the acids of this invention showed that the polymer had good wetting characteristics and produced products having a small percent of voids as compared with the presently available materials. Thus, it is clear that the novel acids and anhydrides of this invention not only improves the thermal and oxidative stability of the polymeric materials, but also provides a means of preparing otherwise difficult to obtain useful objects.

Accordingly, it is an object of this invention to provide aromatic polycarboxylic acids and the anhydrides thereof useful in the preparation of aromatic/heterocyclic polymers which are oxidative and thermally stable at elevated temperatures.

Another object of this invention is to provide aromatic polycarboxylic acids and the anhydrides thereof for the preparation of "stiff" polymers which are resistant to creep and have excellent dimensional stability under stress.

Another object of this invention is to provide aromatic polycarboxylic acids and the anhydrides thereof which preferably may be condensed with aromatic diamines and tetramines to form the corresponding polymers, e.g., polybenzimidazoles, polyimides, polyimidazopyrrolones which are useful in the manufacture of thermally-stable laminates, adhesives, coatings, fiber, films, and related articles.

It is a further object of this invention to provide new diacid and dianhydride monomers capable of being condensed with aromatic diamines and tetramines to form polymers containing the phenoxyphenyl sulfone group which imparts thermal stability and improved solubility to the products.

These and other objects of the invention will become apparent from a further and more detailed description of the invention as follows.

More specifically, this invention relates to the composition of polycarboxylic acids, the corresponding anhydrides and isomers thereof characterized by the formula:

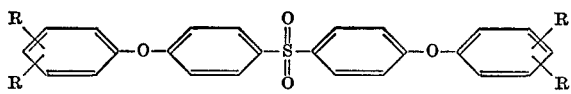

wherein R is selected from the group consisting of hydrogen, carboxylic acid, and anhydrides thereof. It is essential, however, that at least one of the above mentioned R groups is a carboxylic acid group or the anhydride, and preferably, a diacid or dianhydride.

To illustrate the preparation of the novel acids and anhydrides of this invention, approximate stoichometric amounts of an alkali-metal $C_1$–$C_8$ mono- or poly-alkyl substituted phenoxide may be reacted with bis(chlorophenyl) sulfone in an organic solvent as illustrated below:

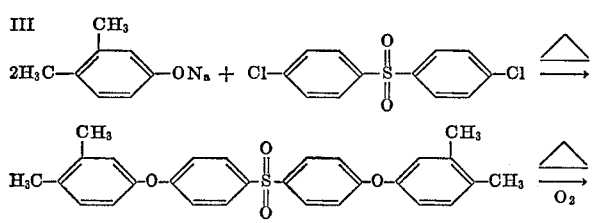

The intermediate bis(3,4-dialkyl phenoxyphenyl) sulfone is heated in the presence of oxygen to obtain the corresponding bis(dicarboxyphenoxyphenyl) sulfones from which the dianhydrides are derived as illustrated below:

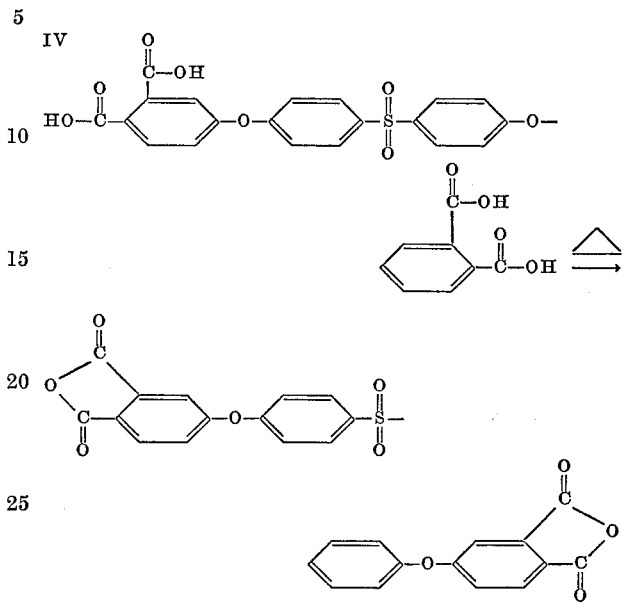

By using as the initial reactant a mono-substituted rather than a di-substituted alkyl alkali-metal, e.g., a Na, K, or Li phenoxide, it is possible to obtain the corresponding bis(carboxyphenoxyphenyl) sulfone, as illustrated in Equation V.

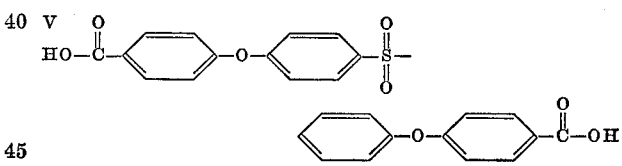

It is obvious that the chemical structure of the final products will depend upon the particular reactants initially used in obtaining the intermediate sulfones. Thus, for example, the 3-alkylphenoxide or 2,3-dialkylphenoxide may be used in the initial reaction with the bis(chlorophenyl) sulfone to obtain the corresponding bis(monoalkylphenoxyphenyl) sulfone and the bis(dialkylphenoxyphenyl) sulfone respectively.

The following examples illustrate the methods employed in preparing the acids and anhydrides in accordance with this invention.

EXAMPLE 1

The composition bis(4-methylphenoxyphenyl) sulfone was prepared by dissolving 143.59 parts by weight of bis (p-chlorophenyl) sulfone in a solution containing 400 mls. of dimethylsulfoxide and 80 mls. of chlorobenzene. To this solution was added about 143.14 parts by weight of dry sodium p-methylphenoxide. The solution was heated for about 40 hours at 145° C. in an atmosphere of nitrogen. The solution was then cooled to about room temperature, poured into a beaker containing 300 mls. of water at 10° C. and stirred for about 18 hours. The bis(4-methylphenoxyphenyl) sulfone was collected by filtration and recrystallized twice from 2-propanol. The crystals were dried at 110° C. under a vacuum. About 136 parts by weight of bis(4-methylphenoxyphenyl) sulfone were recovered for a yield of about 63%. The product had a melting point ranging from about 138.5° to 139.5° C. An analysis of the product is as follows:

Theoretical calculations ($C_{26}H_{22}O_4S$)

Theory

| | |
|---|---|
| Carbon | 72.54 |
| Hydrogen | 5.15 |
| Chlorine | 0.00 |

Found

| | |
|---|---|
| Carbon | 72.15 |
| Hydrogen | 5.15 |
| Chlorine | 0.00 |

EXAMPLE 2

The composition bis(4-carboxyphenoxyphenyl) sulfone was prepared by dissolving 64.5 parts by weight of the precursor bis(4-methylphenoxyphenyl) sulfone in a solution containing 500 mls. of pyridine and 100 mls. of water. The solution was heated until reflux temperatures were obtained and then 31.61 parts by weight of solid potassium permanganate were added, as rapidly as necessary, to maintain the refluxing temperature. After the addition was complete, the suspension was refluxed for two hours, filtered hot through a diatomaceous earth filter bed and washed with hot pyridine. The light yellow filtrate was then evaporated down to about 100 mls. under a vacuum. The residue was dissolved in 500 mls. of 1.8 normal sodium hydroxide solution. The basic NaOH solution was oxidized and filtered using 31.6 parts by weight of potassium permanganate. The filtrate from the basic mixture was oxidized again with potassium permanganate. The excess permanaganate was destroyed with ethanol. The filtrate from this oxidation was cooled to 10° C. and acidified to a pH of 1 with 6 normal hydrochloric acid. The acid solution was allowed to stand overnight and the white precipitate was collected by filtration and washed with 200 mls. of cold water. The wet cake was placed in a 1000 mls. of glacial acidic acid, boiled for about five minutes and then cooled to room temperature. The product was collected by filtration and washed with 400 mls. of methanol followed by drying at 135° C. for about 2 hours. The product was bis (4-carboxyphenoxyphenyl)sulfone which had a melting point of about 300° to 301.5° C. The product was found to have the following analysis:

Theoretical calculations ($C_{26}H_{18}O_8S$)

Theory

| | |
|---|---|
| Carbon | 63.66 |
| Hydrogen | 3.71 |

Found

| | |
|---|---|
| Carbon | 63.82 |
| Hydrogen | 3.93 |

EXAMPLE 3

The composition bis(3,4-dimethylphenoxyphenyl) sulfone was prepared as follows: Approximately 143.59 parts by weight of bis(p-chlorophenyl) sulfone was dissolved in a solution containing 500 mls. of dimethylsulfoxide and 86 mls. of chlorobenzene. To this solution was added 158.57 parts by weight of dry sodium 3,4-dimethylphenoxide. The solution was heated for about 44 hours at 145° C. in an atmosphere of nitrogen. The hot solution was poured into ice water with stirring. The white solid formed was washed with cold distilled water and filtered. The white solid was then dried in a vacuum at 90° C. and then recrystallized twice in 2-propanol. The product was found to have a melting point of about 128.5 to 130.0° C.

The product was analyzed and found to have the following analysis:

Theoretical calculations ($C_{28}H_{26}O_4S$)

Theory, percent

| | |
|---|---|
| Carbon | 73.33 |
| Hydrogen | 5.72 |
| Chlorine | 0.00 |

Found, percent

| | |
|---|---|
| Carbon | 72.93 |
| Hydrogen | 5.51 |
| Chlorine | 0.51 |

EXAMPLE 4

The composition bis(3,4-dicarboxyphenoxyphenyl) sulfone was prepared by dissolving 45.86 parts by weight of the previously prepared bis(3,4-dimethylphenoxyphenyl) sulfone in a solution containing 500 mls. pyridine and 100 mls. water. The solution was heated until reflux and then 63.22 parts by weight of solid potassium permanganate were added as rapidly as was necessary to maintain the refluxing temperature. After the addition was completed, the suspension was refluxed for two hours, filtered hot through a diatomaceous-earth filter bed, washed with hot pyridine, and then evaporated to 100 mls. under a vacuum. The residue was dissolved in 500 mls. of 1.8 normal sodium hydroxide solution. The filtrate from the basic solution was again oxidized and filtered using 63.22 parts by weight of potassium permanganate. The excess permanganate was destroyed with ethanol. The filtrate from this oxidation was cooled to 10° C. and acidified to pH of 1 with 6 normal hydrochloric acid. The acid solution was allowed to stand overnight. A white precipitate was collected by filtration and washed with 200 mls. of cool water. The wet cake was placed in 500 mls. of water and the water heated until all the cake had dissolved. The solution was allowed to cool to room temperature, at which time the material recrystallized from solution. The crystals were collected and dried under a vacuum over phosphorous pentoxide. The yield was about 18.1 parts by weight of bis(3,4-dicarboxyphenoxyphenyl) sulfone which had a melting point of about 172° C.

The product bis(3,4-dicarboxyphenoxyphenyl) sulfone dianhydride was prepared by placing approximately 8 parts by weight of bis(3,4-dicarboxyphenoxyphenyl) sulfone in 150 mls. of acetic anhydride. The solution was heated to boiling, boiled for about five minutes, and then allowed to cool. Yellow needles crystallized from the solution. The needles were collected and dried under a vacuum at 115° C. for about one hour. The yield was approximately 70% of bis(3,4-dicarboxyphenoxyphenyl) sulfone dianhydride which had a melting point of about 253.5° to 254° C. The product was analyzed as follows:

Theoretical calculations ($C_{28}H_{14}O_{10}S$)

Theory, percent

| | |
|---|---|
| Carbon | 61.99 |
| Hydrogen | 2.60 |
| Sulfur | 5.91 |

Found, percent

| | |
|---|---|
| Carbon | 61.56 |
| Hydrogen | 2.84 |
| Sulfur | 5.36 |

EXAMPLE 5

The precursor bis(3 - methylphenoxyphenyl) sulfone was prepared by adding 215.4 parts by weight of bis(p-chlorophenyl) sulfone and 236.7 parts by weight of dry sodium 3-methylphenoxide to 800 mls. of dimethylsulfoxide and 160 mls. chlorobenzene. The solution was heated at 145° C. for 44 hours in an atmosphere of nitrogen. The hot solution was poured into iced water and the suspension stirred for two hours. A light-brown oil was recovered by decanting. The oil was dissolved in hot 2-propanol, then allowed to stand at room temperature for about 24 hours. A yield of about 70% was obtained. The melting point of bis(3-methylphenoxyphenyl) sulfone was 80.0°–82.50° C.

Preparation of bis(3 - carboxyphenoxyphenyl) sulfone was obtained by dissolving 43.05 parts by weight of bis(3-methylphenoxyphenyl) sulfone in 500 mls. of pyridene and 100 mls. of water. The solution was heated until reflux and then 31.61 parts by weight of solid potassium permanganate were added, as rapidly as was necessary, to maintain the refluxing temperatures. After the addition was complete, the suspension was refluxed for two hours, filtered hot through a diatomaceous earth filter bed, washed with hot pyridine, and evaporated to 100 mls. under a vacuum. The residue was dissolved in 500 mls. of 1.8 normal sodium hydroxide solution. The basic solution was oxidized and filtered as indicated above with 31.61 parts by weight of potassium permanganate. The filtrate from the basic solution was again oxidized and filtered exactly as indicated above with 31.61 parts by weight of potassium permanganate. The excess permanganate was subsequently destroyed with ethanol. The filtrate from this oxidation was cooled to 10° C. and acidified to a pH 1 with 6 normal HCl. The acid solution was allowed to stand overnight. The white precipitate was collected by filtration and washed with 200 mls. of cold water. The cake was repeatedly extracted with boiling water. Upon cooling, small platelike crystals formed in the water. The product was collected by filtration then dried in air for two hours at 135° C. The melting of the product, bis(3-carboxyphenoxyphenyl) sulfone was 217°–219° C.

As suggested, the acids and/or anhydrides obtained in accordance with this invention are particularly useful for preparing polymers including, for example, polyimidazopyrrolones, polyimides, polybenzimidazoles, etc., by reacting the acid or anhydride with various polyamines including the diamines and tetramines. More specifically, the acid, i.e., bis(4 - carboxyphenoxyphenyl) sulfone may be condensed with a tetramine, i.e., diaminobenzidine to obtain polybenzimidazole as illustrated in the following equation:

VI

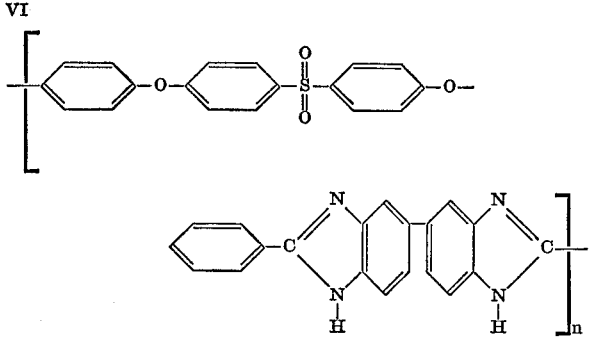

These polymers were used to prepare thick laminated structures with glass and graphite for ablative evaluations in simulated rocket-exhaust environments. The polymers exhibited improved thermal behavior as illustrated by thermogravimetric analysis wherein the initial weight loss in the presence of oxygen was at about 420° C. The char yield of the polybenzimidazole at about 800° C. was 83%.

The acids or anhydrides of this invention are useful also for preparing polybenzimidazopyrrolones which are satisfactory as a resin system for ablative materials, thermally-stable laminates, adhesives, coatings, etc. The acids or anhydrides may be condensed with tetramines, i.e., diaminobenzidine, to obtain polymers having the bis(phenoxyphenyl) sulfone backbone as shown by the following equation:

VII

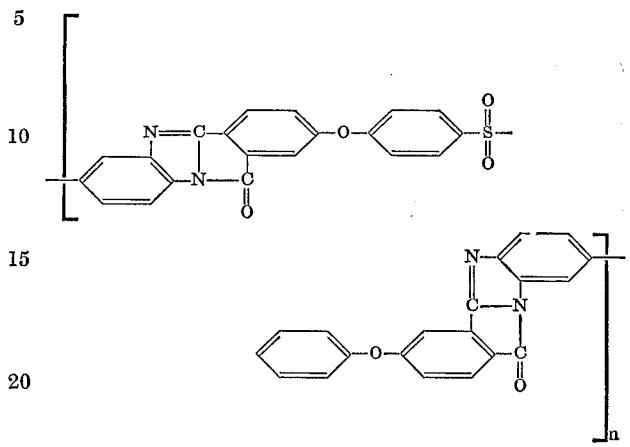

Similarly, polyimide resins containing the bis(phenoxyphenyl) sulfone backbone were prepared and used for the fabrication of glass laminates. The polyimides were soluble in high-temperature laminating solvents which enabled preparation of the prepregs by dipping the reinforcing material, e.g., glass cloth, followed by the removal of excess solvent and the forming of the imide at temperatures of about 350° F. Thermogravimetric analysis of the polyimide laminates in air and in nitrogen showed initial weight losses at temperatures of about 400° C. in air and about 500° C. in nitrogen. These polyimides may be prepared, for example, by condensing bis(3,4 - dicarboxyphenoxyphenyl) sulfone dianhydride with benzidine as illustrated by the following equation:

VIII

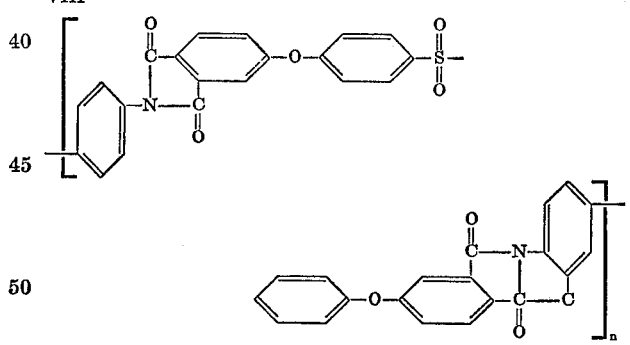

It is obvious that anti-oxidants and/or stabilizers and the like may be used in combination with the polymeric materials if desired. Moreover, the polymeric materials obtained from the acids of this invention may be used in combination with various dye-stuffs and pigments, particularly when the materials are to be used in the preparation of molded or extruded articles. These polymers may contain also various fillers and reinforcing agents including silica, glass, carbon black, metal, fibers, and various mixtures thereof.

While this invention has been described with respect to a number of specific embodiments, it is obvious that there are other variations and modifications which can be used without departing from the spirit and scope of the invention as particularly pointed out in the appended claims.

What is claimed is:

1. A bis compound which is a dicarboxylic acid, tetra carboxylic acid, or tetracarboxylic dianhydride of the formula:

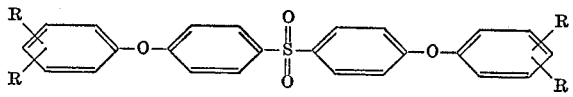

wherein R is selected from the group consisting of hydrogen, carboxy, and anhydrides thereof, with at least one pair of the R groups being carboxy.

2. The compound of claim 1 further characterized as bis(3,4-dicarboxyphenoxyphenyl) sulfone.

3. The compound of claim 1 further characterized as bis(3,4-dicarboxyphenoxyphenyl)sulfone.

4. The compound of claim 1 further characterized as bis(2,3-dicarboxyphenoxyphenyl) sulfone.

5. The compound of claim 1 further characterized as bis(3,4-dicarboxyphenoxyphenyl) sulfone dianhydride.

6. The compound of claim 1 further characterized as bis(2,3-dicarboxyphenoxyphenyl) sulfone dianhydride.

7. A process for preparing aromatic carboxylic acids and anhydrides comprising:
  (a) reacting bis(chlorophenyl) sulfone with alkali metal alkylphenoxide to obtain the bis(alkyl substituted phenoxyphenyl) sulfone intermediate; and
  (b) oxidizing said intermediate to obtain the corresponding bis(carboxyphenoxyphenyl) sulfone.

8. The process of claim 7 further characterized in that the alkali metal alkylphenoxide is sodium methylphenoxide.

9. The process of claim 7 further characterized in that the alkali metal alkylphenoxide is sodium dimethylphenoxide.

References Cited

UNITED STATES PATENTS 3,431,240   3/1969   Vogel et al. _____ 260—346.3

OTHER REFERENCES

Lubowitz, Jones, Cassey, Vaughan and Burns, Nasa Contract Rep. *1969*, Nasa-CR1404; Chemical Abstr. 1969, vol. 71, 61957.

DONALD G. DAUS, Primary Examiner

B. DENTZ, Assistant Examiner

U.S. Cl. X.R.

260—346.4, 78, 520, 75